United States Patent [19]

Wight

[11] Patent Number: 4,716,578

[45] Date of Patent: Dec. 29, 1987

[54] CIRCUIT AND METHOD FOR THE RECOVERY OF DATA FROM A DIGITAL DATA STREAM

[75] Inventor: Mark S. Wight, Ottawa, Canada

[73] Assignee: Northern Telecom Limited, Montreal, Canada

[21] Appl. No.: 912,481

[22] Filed: Sep. 29, 1986

[51] Int. Cl.⁴ .............................................. H04L 7/02
[52] U.S. Cl. ...................................... 375/20; 375/106
[58] Field of Search ............... 375/20, 95, 106, 110, 375/111; 360/51; 307/516, 269; 328/72, 74; 371/61; 370/100, 105

[56] References Cited

U.S. PATENT DOCUMENTS

| | | | |
|---|---|---|---|
| 4,282,601 | 8/1981 | Flora | 375/20 |
| 4,425,646 | 1/1984 | Kinoshita et al. | 360/51 |
| 4,453,260 | 6/1984 | Inagawa et al. | 370/105 |
| 4,544,914 | 10/1985 | Chan et al. | 307/269 |
| 4,620,300 | 10/1986 | Ogawa | 360/51 |
| 4,630,139 | 12/1986 | Dickens | 360/51 |
| 4,661,801 | 4/1987 | Chen et al. | 375/20 |

*Primary Examiner*—Benedict V. Safourek
*Attorney, Agent, or Firm*—F. P. Turpin

[57] ABSTRACT

The invention provides an interface circuit for connection between an input data port and a data receiver. A data recovery circuit is responsive to a data stream on the input port for generating data pulses corresponding thereto and a clock recovery circuit is responsive to the data pulses for generating clock signals. A circuit is responsive to the clock signals and the data pulses for generating, for each data pulse, a recognition window having a maximum width approximately corresponding to the combined duration of the data pulse being recognized and one of the clock pulses. A data synchronization circuit is responsive to the output from the circuit and to the recovered clock signals for generating synchronous data.

10 Claims, 6 Drawing Figures

CIRCUIT AND METHOD FOR THE RECOVERY OF DATA FROM A DIGITAL DATA STREAM

FIELD OF THE INVENTION

The invention relates generally to digital transmission circuits and more particularly to a circuit and method for recovering data from a digital data stream.

BACKGROUND OF THE INVENTION

It is increasingly common to transmit information from one location to another via digital transmission facilities. For example, the telephone network conventionally uses digital communication links on which is transferred data at the DS1 -digital signal level 1 - or multiple thereof. A DS1 signal is usually defined as a bipolar data stream having a 1.544 MHz frequency.

One of the problems with digital transmission is that, as the signal is transmitted along the transmission path, it traverses a plurality of regenerating stations or repeaters that cause the signal to suffer a phenomenon known as jitter. Because jitter causes the digital signal to oscillate at a lower frequency than the signal data and since the signal also carries the inherent clock or synchronization information, it is a necessary feature of any digital receiver circuit that it provides some means for minimizing the effect of jitter on the recovered data.

To this end, digital data receivers usually have an interface circuit for connection between an input port and the receiver itself. An interface circuit usually includes a data recovery circuit responsive to a bipolar data stream appearing on an input data port for reforming it into a pair of unipolar data streams, and a clock recovery circuit responsive to the pair of data streams for deriving clock signals therefrom as well as a data synchronization stage for synchronizing the received data with the recovered clock for use by subsequent digital circuitry such as a data receiver.

In the case of DS1 transmission, the data stream is a bipolar signal which is converted by the data recovery stage into a pair of unipolar signals. A logical one on the incoming DS1 signal appears as a pulse on one of the outputs of the data recovery stage, each pulse being nominally one-half of a 1.544 MHz clock cycle. A logical zero is the absence of such a pulse at the outputs of the data recovery stage.

The clock recovery stage recovers a 1.544 MHz clock signal from the incoming DS1 signal. It is therefore necessary to establish a phase relationship between the recovered clock and data to avoid data errors in the data synchronization stage. The recovered clock may have a significant amount of jitter due to the cumulative effect of the repeaters on a DS1 carrier and is also dependent on the incoming DS1 data pattern. There is consequently a certain amount of differential phase jitter between the recovered clock and received data dependent on the clock recovery technique. There must therefore be a significant amount of phase margin between the recovered clock and received data to absorb the effects of the clock-data jitter.

DISCUSSION OF THE PRIOR ART

In the known circuits, the output signal of the clock recovery circuit is designed to provide clock signals whose clocking edges are nominally at the center of the pulses of the received data. This arrangement provides a ±90 degrees phase immunity against jitter. That is, jitter has to exceed one-half of a recovered data pulse before the recovered clock signal fails to gate it to the receiver. This phase alignment is conventionally achieved using such techniques and circuits as phase tuning, injection locked oscillators and phase-lock-loop circuits. However, in spite of these rather expensive solutions, the performance of the resulting circuits is sometimes not adequate to provide a jitter immunity that meets predetermined specifications of standards authorities.

The present invention provides a solution which significantly improves the jitter immunity of a data receiver at a substantially reduced cost by eliminating the need for expensive clock recovery circuits and simplifying the data recovery stage. In addition, the pulse width of the recovered data signals is not critical to the generation of the output signals; hence, the jitter performance of the circuit is not dependent on the incoming DS1 signal pulse shape. Also, the noise immunity is improved because the circuit of the invention filters out noise in the recovered data signals.

SUMMARY OF THE INVENTION

In accordance with the invention, there is provided an interface circuit for connection between an input data port and a data receiver. A data recovery circuit is responsive to a data stream on the input port for generating data pulses corresponding thereto and a clock recovery circuit is responsive to the data pulses for generating clock signals. A circuit means is responsive to the clock signals and the data pulses for generating, for each data pulse, a recognition window having a maximum width approximately corresponding to the combined duration of the data pulse being recognized and one of the clock pulses. A data synchronization circuit is responsive to the output from the circuit means and to the recovered clock signals for generating synchronous data.

Also in accordance with the invention there is provided a method of recovering data from a data stream received at an input data port, the method comprising the step of, for each data pulse being received, generating a recognition window having a maximum width approximately corresponding to the combined duration of the data pulse being received and one of the clock pulses recovered from the data stream.

Since the circuit and method of the invention provide a recognition window approximately corresponding to 180 degrees of a received data bit, the jitter immunity of the receiver is greatly enhanced.

DESCRIPTION OF THE DRAWINGS

An example embodiment of the invention will now be described in conjunction with the drawings in which:

FIG. 1 shows a data receiver 10 connected to an input data port 11 through a data receiver interface circuit comprising a data recovery circuit 12 and a clock recovery circuit 13 as well as a data synchronization circuit 14. The data recovery circuit 12 is responsive to the bipolar DS1 data stream on data port 11 for providing a pair of unipolar signals RDS1T and RDS1R. Each bit of these signals has a width corresponding to one-half of a clock cycle duration. At the same time, the clock recovery circuit 13 is responsive to the ORRED result of the unipolar signals for providing clock signals at the DS1 data rate. The data synchronization circuit 14 responds to the unipolar signals and the clock signals by providing synchronous data to the data receiver 10. The output clock signals from the clock recovery circuit 13 are adjusted so that the clocking edge of each clock pulse is at the nominal center of the pulses of incoming data. The data synchronization circuit 14 consists basically of D-type flip-flops having their data inputs clocked by the recovered clock signals thereby providing approximately ±90 degrees of noise immunity; that is, the clocking edge of the clock pulse may occur anytime during one of the unipolar data pulses.

FIG. 2 shows a data receiver interface circuit similar to that of FIG. 1 except that a window generator 15 is connected between the data recovery circuit 12 and the data synchronization circuit 14. The output signals from the clock recovery circuit 13 are inverted by gate 16 and serve to clock the window generator 15 and the data synchronization circuit 14.

FIGS. 3A and 3B are schematic diagrams of the circuit of FIG. 2. The DS1 data stream is received at a transformer T1 and applied to a threshold tracking circuit comprised of comparators 30 and 31 and associated components whose outputs are fed to data recovery comparators 32 and 33 and associated components. These comparators provide output signals RDS1T and RDS1R corresponding to the input data that exceeds the threshold level set by comparators 30 and 31.

The clock recovery circuit 13 is adapted to receive the RDS1T and RDS1R signals and recover the DS1 clock rate signals therefrom. The signals are received by a pair of transistors 34 and 35 and fed to a conventional tunable passive resonant filter comprised of inductor L1, capacitor C1 and associated circuitry. The filter output is fed to a comparator 36 and gate 37 to provide the recovered clock signal RCLK.

Figure 1:
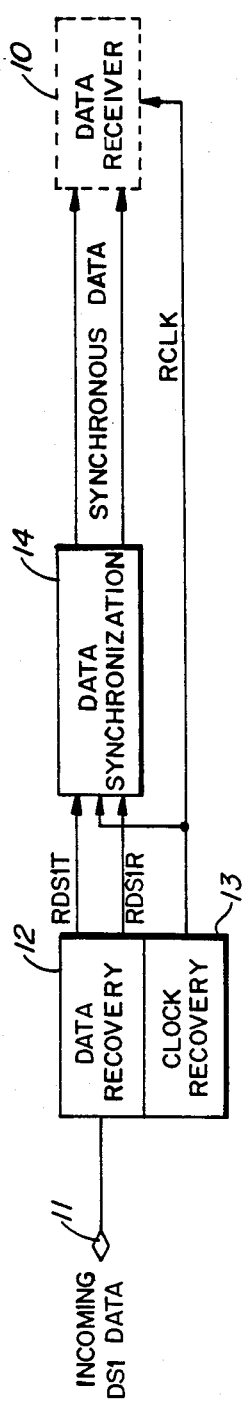
FIG. 1 is a block diagram of a prior art data receiver.
Figure 2:
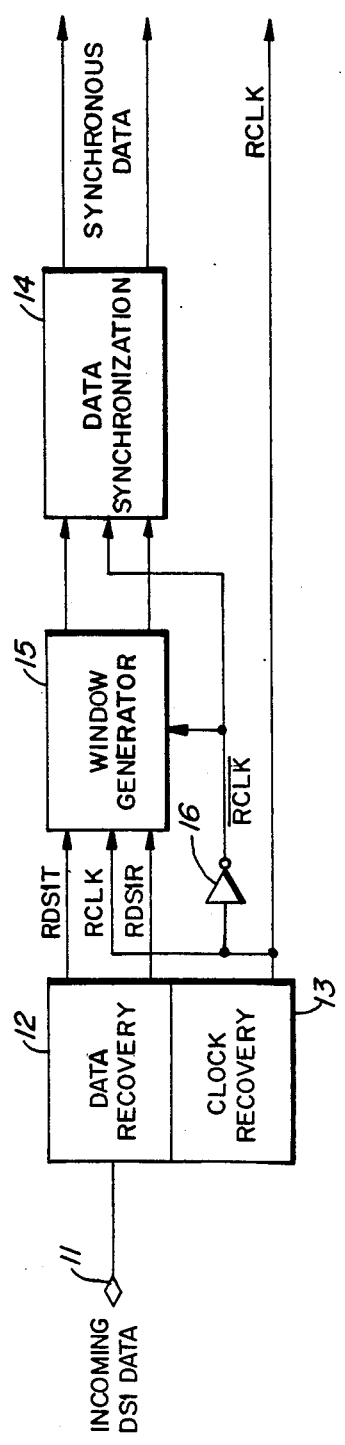
FIG. 2 is a block diagram of a data receiver interface circuit in accordance with the invention.
Figure 3A:
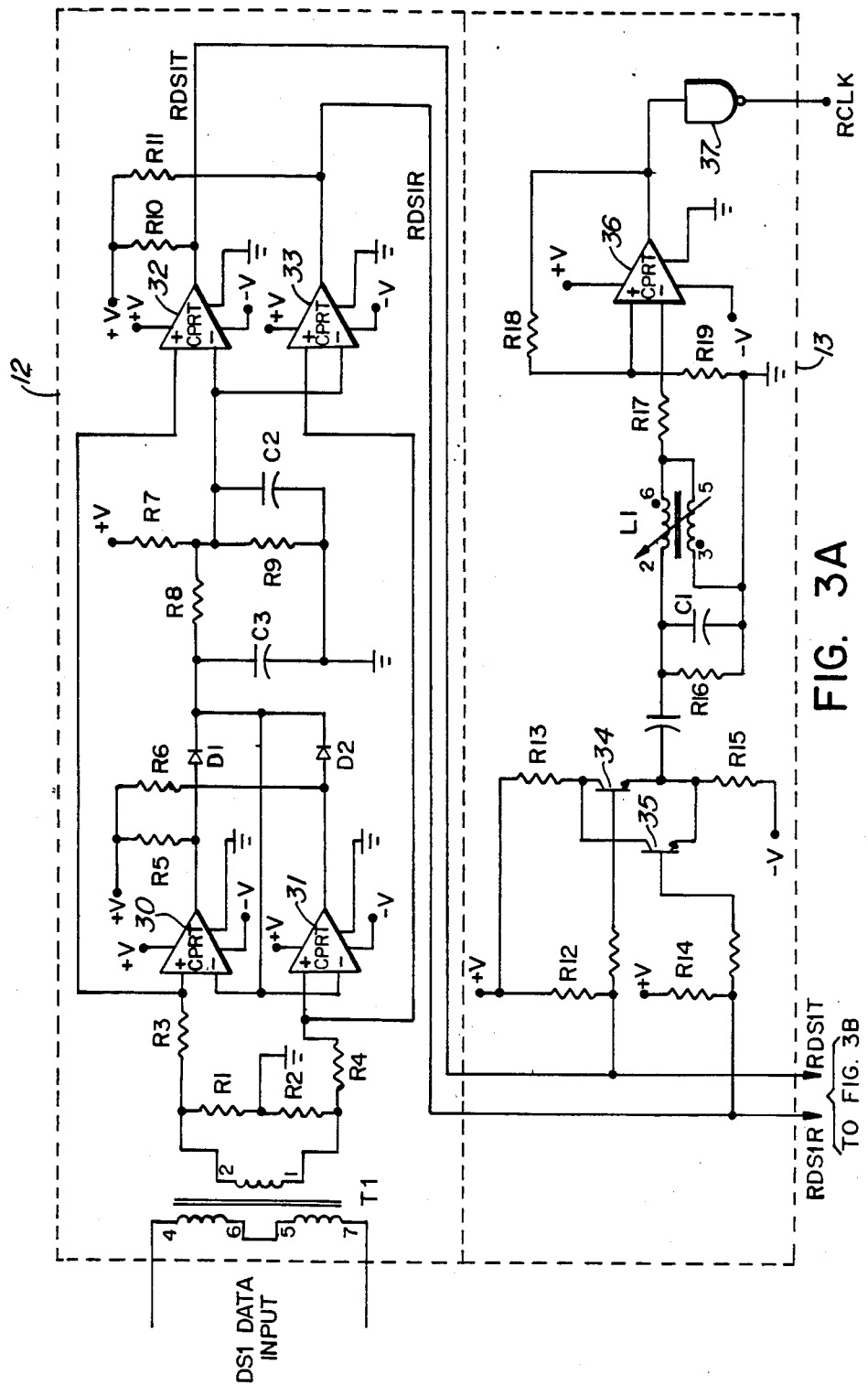
FIGS. 3A and 3B are schematic diagrams of the circuit illustrated in FIG. 2.
Figure 3B:
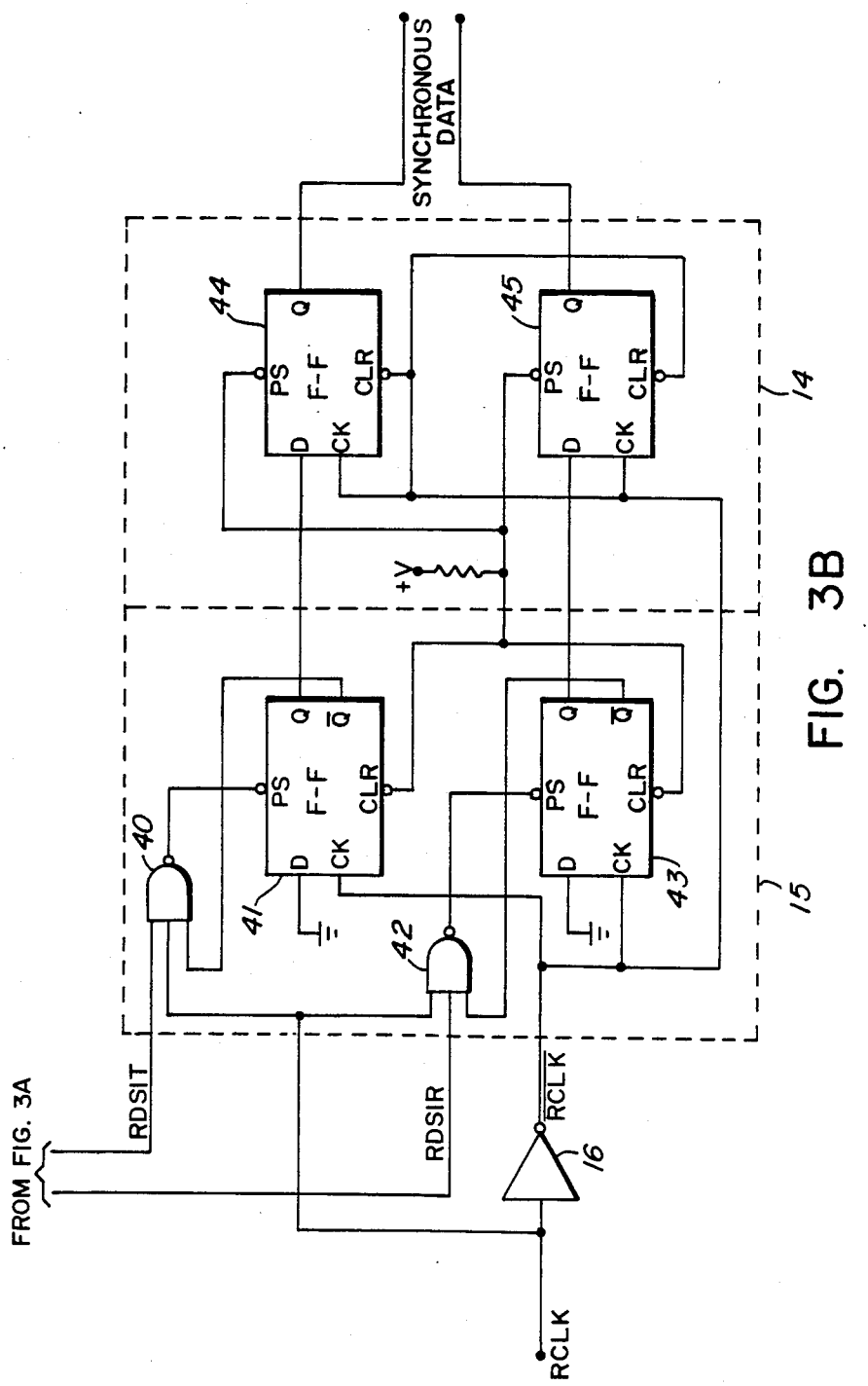

The RDS1T, RDS1R and RCLK signals are fed to the window generator circuit 15 of FIG. 3B. The RDS1T signal is fed to a NAND gate 40 having its output connected to a presettable flip-flop 41. Similarly, the RDS1R signal is fed to a NAND gate 42 having its output connected to a presettable flip-flop 43. The Q outputs of flip-flops 41 and 43 are connected to the data inputs of the respective flip-flops 44 and 45 whose outputs provide synchronous data signals. The gates 40 and 42 also have inputs connected to the source of recovered clock signals RCLK and to respective $\overline{Q}$ output terminals of flip-flops 41 and 43. The data inputs of the latter are connected to a source of low level signals and are clocked by the $\overline{RCLK}$ signals from gate 16. The presettable flip-flops are D-type devices and a low-level signal at the preset (PS) or clear (CLR) inputs sets or resets the outputs regardless of the levels at the other inputs. When PS and CLR are inactive (high), data at the data (D) input are transferred to the outputs on the positive-going or clocking edge (CE) of the clock pulse $\overline{RCLK}$ at the CK input terminal. The flip-flops may conveniently be off-the-shelf components such as type 74ALS74.

Figure 4A:
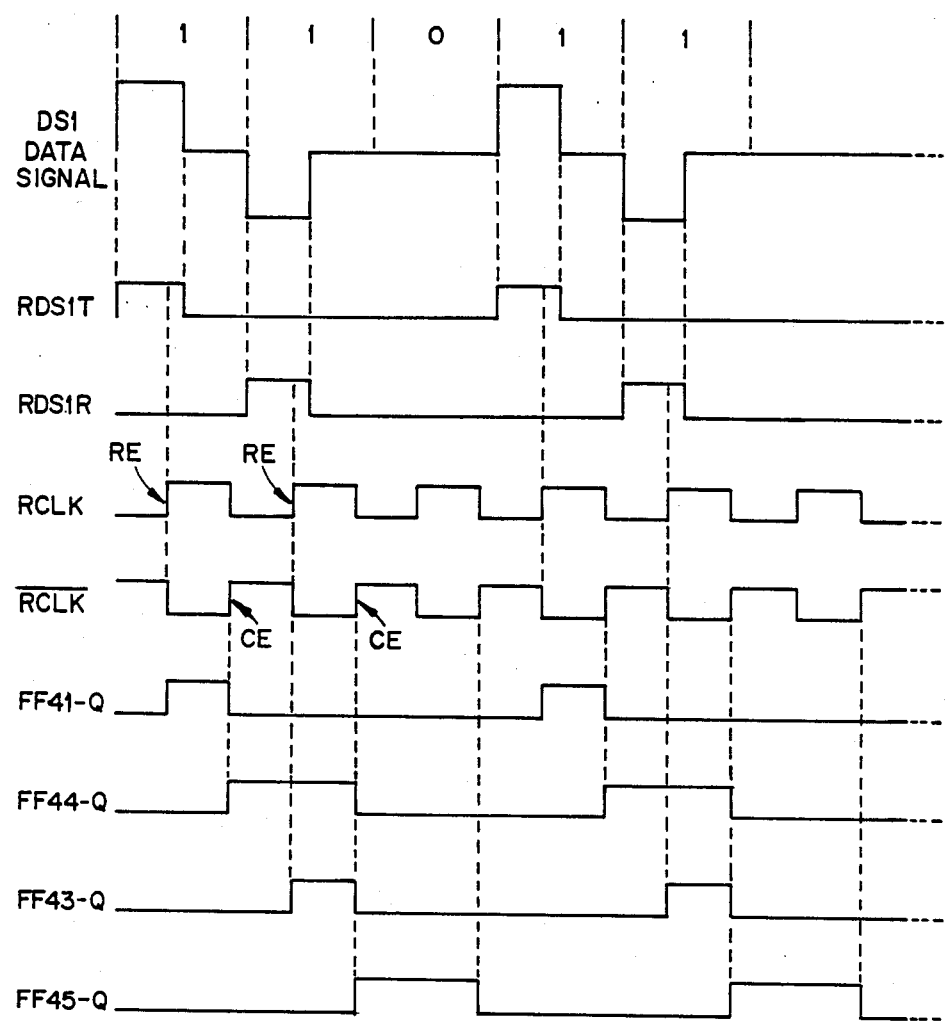
FIGS. 4A and 4B are waveform diagrams depicting the signals at various locations in the circuits of FIGS. 3A and 3B.
Figure 4B:
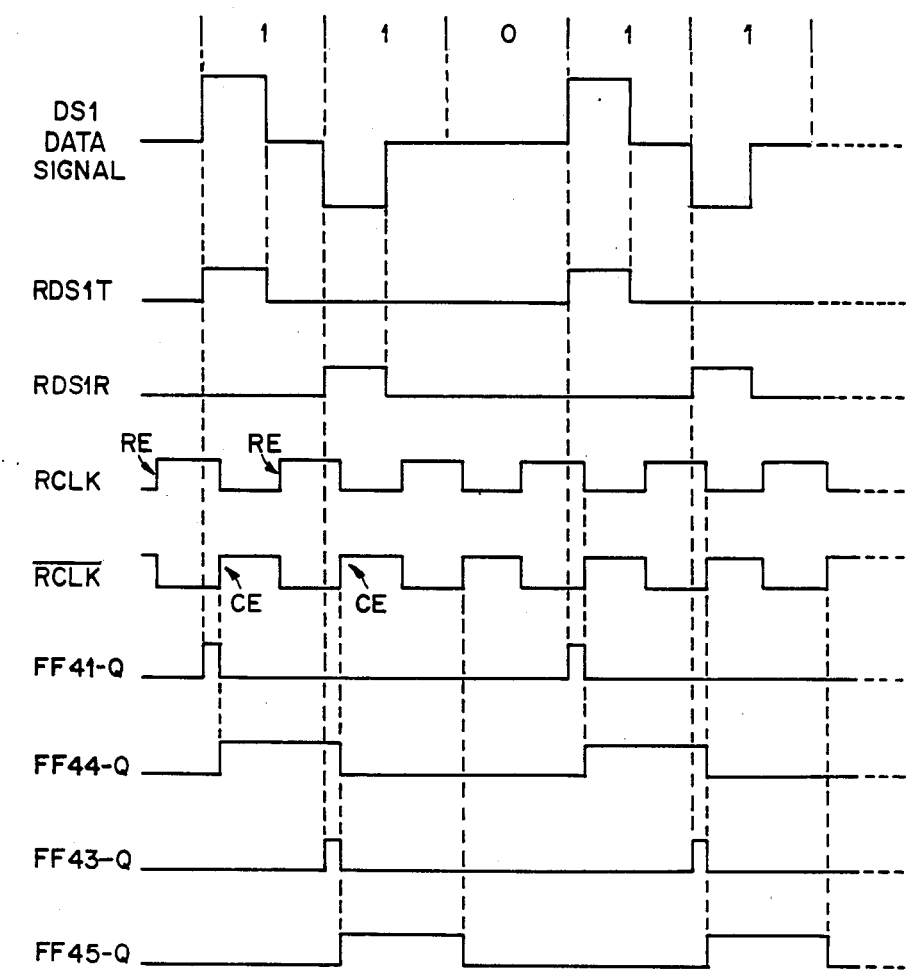

The operation of the circuit will be better understood by reference to the waveform diagrams of FIGS. 4A and 4B in conjunction with the schematic diagrams of FIGS. 3A and 3B. The difference between FIGS. 4A and 4B is that in the case of FIG. 4A, the rising edge (RE) of the recovered clock signal RCLK is shown to be near the falling edges of the recovered data signals RDS1T and RDS1R whereas in FIG. 4B, the rising edge RE of the RCLK signal is shown to occur before the rising edges of the recovered data pulses.

Since the RDS1T and RDS1R signals are treated similarly, the operation will only be described in relation to the RDS1T signals. The waveform diagrams show a DS1 data signal consisting of bits 11011 that are recovered to be the RDS1T and RDS1R signals as shown in FIGS. 4A and 4B. As noted previously, each data bit of these signals has a width corresponding to one half the duration of a recovered clock cycle. At the coincidence of any portion of the high level portion of the clock signal RCLK and RDS1T, the output of NAND gate 40 is driven to a low level thereby causing the preset input of flip-flop 41 to go low thus setting it and causing its Q output to go high. The low level at the preset input is quickly removed however since the $\overline{Q}$ output of the flip-flop is now low. At the subsequent clocking edge CE of the $\overline{RCLK}$ signal, the level at the Q output of flip-flop 41 is clocked into the flip-flop 44 causing its Q output to go high. At the same time, the clocking edge of the $\overline{RCLK}$ signal causes the flip-flop 41 to be reset by clocking in the low-level signal at its data input. At the next clocking edge CE of the $\overline{RCLK}$ signal, the low-level signal at the Q output of flip-flop 41 is clocked into flip-flop 44 thus resetting it and causing its output to go low. It is therefore seen that the coincidence of any portion of an input data bit and a clock pulse results in the data bit being detected and that for any such detection, the data synchronization circuit generates a pulse having a duration equivalent to a recovered clock cycle.

The circuit of the invention thus provides a marked improvement in jitter immunity while using economical data and clock recovery circuits. In addition, since the data detection period which corresponds to the switching time of flip-flops 41 and 43 and gates 40 and 42 is very short, the circuit acts like a filter to also provide a marked improvement in the noise immunity characteristics of the receiver.

Although the circuit was described in the context of DS1 data transmission, it is readily adaptable for use with other types and levels of data transmission without departing from the scope and spirit of the invention.

What is claimed is:

1. An interface circuit for connection between an input data port and a data receiver comprising, a data recovery circuit responsive to a data stream on the input port for generating data pulses corresponding thereto, a clock recovery circuit for deriving clock signals from said data pulses and including inverter means for providing inverted clock signals, circuit means responsive to the clock signals and the data pulses for generating, for each data pulse, a recognition window having a maximum width approximately corresponding to the combined duration of the data pulse being recognized and one of the clock pulses, and a data sycnronization circuit responsive to the output from the circuit means and to the recovered inverted clock signals for providing output data pulses each having a pulse width corresponding to that of a recovered clock cycle.

2. An interface circuit as defined in claim 1 wherein the circuit means comprises a first D-type flip-flop having a preset input terminal and a data input terminal connected to a low-level source, and AND gating means responsive to the coincidence of one of said data pulses, one of the recovered clock signals and the $\overline{Q}$ output of the first flip-flop for generating a set signal at the preset input terminal, the flip-flop being responsive to the next clocking edge of an inverted clock signal for resetting itself.

3. An interface circuit as defined in claim 2 wherein the data syncrhonization circuit comprises a second D-type flip-flop having its data input terminal connected to the Q output terminal of the first flip-flop, the second flip-flop being responsive to inverted clock signals for providing said output pulses.

4. A method of recovering data from a data stream received at an input data port, the receiving circuitry comprising a clock recovery circuit for deriving clock and inverted clock signals from a data stream appearing at the input port, and a data synchronization circuit responsive to the recovered inverted clock signals and individual pulses from the data stream for providing output pulses each having a width corresponding to that of a recovered clock cycle, the method comprising the step of, at the input of the synchronization circuit, generating in response to each input data pulse and one of the clock signals a recognition window having a maximum width approximately corresponding to that of a clock cycle.

5. A method of recovering data as defined in claim 4 wherein the circuit comprises a first presettable flip-flop and the step of generating the recognition window comprises the steps of momentarily presetting the flip-flop at the coincidence of an input data pulse and one of the recovered clock pulses and resetting the flip-flop by clocking its data input terminal with a subsequent inverted recovered clock signal.

6. A method of recovering data as defined in claim 5 wherein the coincidence is generated by the ANDing of an input data pulse with one of the recovered clock pulses and with the signal level at one of the output terminals of the first flip-flop thereby generating a presettable signal having a duration approximately corresponding to the switching time of the flip-flop.

7. A method of recovering data as defined in claim 6 wherein the synchronization circuit comprises a second flip-flop having its data input terminal connected to the other output terminal of said one flip-flop and the method comprising the further step of clocking the second flip-flop with the inverted recovered clock signal thereby providing an output signal at an output terminal of the second flip-flop, the latter output signal having a width corresponding to that of a recovered clock cycle.

8. An interface circuit for connection between an input data port and a data receiver comprising, a data recovery circuit responsive to a bipolar data stream on the input port for generating a pair of unipolar data streams corresponding thereto, a clock recovery circuit for deriving clock and inverted clock signals from said unipolar data streams, circuit means responsive to the clock signals and to each pulse of the unipolar data streams for generating a recognition window having a maximum width corresponding to the combined duration of one of said pulses and a clock pulse, and a data synchronization circuit responsive to the outputs from the circuit means and to the recovered inverted clock signals for providing a pair of data stream synchronized to the clock signals, each data pulse having a duration corresponding to that of a recovered clock cycle.

9. An interface circuit as defined in claim 8 wherein the circuit means comprises a first pair of D-type flip-flops each having a preset input terminal and a data input terminal connected to a low-level source, and each flip-flop being associated with an AND gating means responsive to the coincidence of one of the data pulses from a respective one of the unipolar data streams, one of the recovered clock signals and the $\overline{Q}$ output of its associated flip-flop for generating a set signal at its preset input terminal, the set flip-flop being responsive to the next clocking edge of an inverted clock signal for resetting itself.

10. An interface circuit as defined in claim 9 wherein the data synchronization circuit comprises a second pair of D-type flip-flops each one having its data input terminal connected to a respective Q output terminal of the first pair of flip-flops, the second pair of flip-flops being responsive to the inverted clock signals for generating said synchronous data.

* * * * *